Patented Nov. 10, 1953

2,658,816

UNITED STATES PATENT OFFICE 2,658,816

PRESSURE METHOD OF PREPARING DIBORANE

Edith M. Boldebuck, John R. Elliott, and George F. Roedel, Schenectady, N. Y., assignors to General Electric Company, a corporation of New York No Drawing. Application November 24, 1948, Serial No. 61,905

1 Claim. (Cl. 23—204)

The present invention relates to the preparation of diborane by the reaction of boron fluoride with lithium hydride. It is particularly concerned with an improved method of reacting the designated materials whereby increased yields of diborane can be obtained.

It has been known previously that boron fluoride reacted with lithium hydride in the presence of ethyl ether to form diborane. It has been found that in the absence of a catalyst and at atmospheric pressure, the addition of boron fluoride to an ether slurry of lithium hydride under anhydrous conditions results in an exothermic reaction followed by a steady evolution of diborane according to the reaction.

(1) $$6LiH + 8BF_3 \xrightarrow{Et_2O} 6LiBF_4 + B_2H_6$$

By means of chemical catalysis, for example, by means of lithium borohydride as described in our copending application Serial Number 61,903, now abandoned, filed concurrently herewith and assigned to the same assignee as the present invention, the course of the reaction may be altered to yield lithium fluoride rather than lithium borofluoride as an end product.

(2) $$6LiH + 2BF_3 \xrightarrow{Et_2O} 6LiF + B_2H_6$$

Reaction 2 is to be preferred over Reaction 1 because of the much more efficient utilization of boron fluoride and the fact that less material must be handled and processed per unit production of diborane.

The present invention is based on the discovery that the overall Reaction 2 may be obtained without adding catalyst by dividing the reaction into two stages and operating the first stage under pressure. In the first stage of the reaction boron fluoride is added to the lithium hydride-ether slurry in a closed vessel from which the diborane is prevented from escaping. As the pressure rises the diborane reacts with excess lithium hydride to form lithium borohydride. Since lithium borohydride and lithium borofluoride are immediately reactive to yield lithium fluoride and diborane, little or no lithium borofluoride can remain as the final product of reaction. In the second and last stage of the reaction, the reaction vessel exit is opened and lithium borohydride is allowed to react with boron fluoride to generate diborane and lithium fluoride, the diborane being collected by any suitable means.

The two stages of the reaction are represented by the following equations:

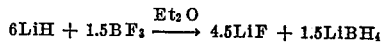
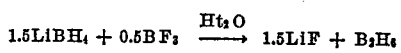

The sum of these equations is Equation 2, the desired reaction.

By this method 80–95% yields of diborane have been consistently obtained.

The following example illustrates one method for carrying out the preparation of diborane in accordance with the present invention.

The reaction was carried out in a steel reactor. Boron fluoride in the form of boron fluoride etherate was slowly added to an ether slurry of lithium hydride in the reactor. The mixture was maintained under an autogenous pressure of diborane with the reaction temperature controlled at 30–35° C. by water cooling of the reaction vessel. The pressure in the reactor rose rapidly to 5–15 p. s. i. and held at a fairly constant value during the addition of three-fourths of the theoretical etherate. A sharp increase in pressure accompanied further etherate addition and the reaction changed from exothermic to endothermic. At this point, pressure on the kettle was released and diborane was collected in a liquid nitrogen-cooled trap while the remaining etherate was added. Final yield of diborane was 80% of the theoretical employing a mol ratio of boron fluoride etherate to lithium hydride of 1:3.

Thus, during the addition of up to three-fourths of the etherate, diborane can be forced to react with lithium hydride by means of pressure to form lithium borohydride. In the presence of lithium borohydride and at the operating temperature of from 30–35° C., lithium borofluoride is immediately reactive with borohydride and hence, cannot accumulate in appreciable quantity. The reaction between lithium borohydride and boron fluoride during the last quarter of the reaction is rapid and clean cut to yield lithium fluoride and diborane.

Yields of about 96% of diborane based on the lithium hydride (Equation 2) can be obtained consistently by means of the pressure reaction if a 10–20% excess of the boron fluoride over that required by Equation 2 is used and the ether is refluxed at the end of the reaction to remove dissolved diborane.

Boron fluoride etherate was employed in this example as a convenient media for handling the boron fluoride. In cases where boron fluoride as such is employed, it is readily absorbed by the ether slurry for reaction with the lithium compound.

While in the specific example heretofore given, about three-quarters of the boron compound was added while preventing release of the diborane reaction product from the reaction vessel, it is to be understood that the invention is not limited to such preferred proportions. In general, the diborane product should be confined in the reaction vessel during the addition of at least a substantial and preferably the major portion of the boron fluoride. For good results, these conditions should be maintained during the addition of from about 45 to 75 percent, of the etherate in order to ensure sufficient reaction of the lithium hydride and diborane to provide the lithium borohydride product in amounts adequate to react with and prevent the accumulation of any lithium borofluoride present in the mixture and formed in accordance with Equation 1.

What we claim as new and desire to secure by Letters Patent of the United States is:

The method of reacting boron fluoride etherate with an ether slurry of lithium hydride in the preparation of diborane which comprises slowly adding said etherate to said slurry in a pressure vessel, confining the reaction products under autogenous pressure during the addition of from about 45 to 75 percent of the etherate, releasing and collecting the diborane reaction product during the addition of the remaining etherate, and maintaining the temperature of the reaction mixture below the boiling point of ether during the reaction.

EDITH M. BOLDEBUCK.
JOHN R. ELLIOTT.
GEORGE F. ROEDEL.

References Cited in the file of this patent
UNITED STATES PATENTS

| Number | Name | Date |
|---|---|---|
| 2,461,661 | Schlesinger et al. | Feb. 15, 1949 |